(12) United States Patent
Chang

(10) Patent No.: US 12,485,165 B2
(45) Date of Patent: *Dec. 2, 2025

(54) VACCINE COMBINATION AND METHOD FOR USING THE SAME

(71) Applicant: Papivax Biotech Inc., Taipei (TW)

(72) Inventor: Yung-Nien Chang, Elkridge, MD (US)

(73) Assignee: Papivax Biotech Inc., Taipei (TW)

( * ) Notice: Subject to any disclaimer, the term of this patent is extended or adjusted under 35 U.S.C. 154(b) by 986 days.

This patent is subject to a terminal disclaimer.

(21) Appl. No.: 17/578,312

(22) Filed: Jan. 18, 2022

(65) Prior Publication Data

US 2023/0226164 A1 Jul. 20, 2023

(51) Int. Cl.
| | | |
|---|---|---|
| *A61K 39/12* | (2006.01) | |
| *A61K 39/395* | (2006.01) | |
| *A61P 31/20* | (2006.01) | |
| *C07K 14/025* | (2006.01) | |
| *A61K 39/00* | (2006.01) | |

(52) U.S. Cl.
CPC .......... *A61K 39/12* (2013.01); *A61K 39/3955* (2013.01); *A61P 31/20* (2018.01); *A61K 2039/53* (2013.01); *A61K 2039/70* (2013.01)

(58) Field of Classification Search
None
See application file for complete search history.

(56) References Cited

U.S. PATENT DOCUMENTS

2021/0330779 A1* 10/2021 Sung .................... A61K 39/12

FOREIGN PATENT DOCUMENTS

| CN | 101100672 A | 1/2008 |
|---|---|---|
| CN | 101280316 A | 10/2008 |
| CN | 101591646 A | 12/2009 |
| CN | 103740741 A | 4/2014 |
| JP | 2013537422 A | 10/2013 |

OTHER PUBLICATIONS

Sun et al. Local HPV Recombinant Vaccinia Boost Following Priming with an Hpv Dna Vaccine Enhances Local HPV-Specific CD8b T-cell-Mediated Tumor Control in the Genital Tract. Clin Cancer Res; 2016, 22(3): 657-669.*
Zhou et al. A novel mutant of human papillomavirus type 18 E6E7 fusion gene and its transforming activity. Asian Pac J Cancer Prev. 2014;15(17):7395-9.*
Li et al. Modified HPV16 E7/HSP70 DNA vaccine with high safety and enhanced cellular immunity represses murine lung metastatic tumors with downregulated expression of MHC class I molecules. Gynecologic Oncology 104 (2007) 564-571.*
Peng et al. Development of DNA vaccine targeting E6 and E7 proteins of human papillomavirus 16 (HPV16) and HPV18 for immunotherapy in combination with recombinant vaccinia boost and PD-1 antibody. mBio 12:e03224-20, Jan. 19, 2021.*
Shiwen Peng et al., "Development of DNA Vaccine Targeting E6 and E7 Proteins of Human Papillomavirus 16 (HPV16) and HPV18 for Immunotherapy in Combination with Recombinant Vaccinia Boost and PD-1 Antibody", mBio. Jan. 19, 2021;12(1):e03224-20. doi: 10.1128/mBio.03224-20.
Pre-clinical safety and efficacy of TA-CIN, a recombinant HPV16 L2E6E7 fusion protein vaccine, in homologous and aterologous prime-boost regimens, S H van der Burg, et al., Vaccine 19 (2001), pp. 3652-3660.
Heat shock protein and anti-tumor immunity, Shusaku Mizukami, Okayama Igakkai Zasshi, vol. 124, Aug. 2012, pp. 175-177.
Development of DNA Vaccine Targeting E6 and E7 Proteins of Human Papillomavirus 16 (HPV16) and HPV18 for Immunotherapy in Combination with Recombinant Vaccinia Boost and PD-1 Antibody, Shiwen Peng, et al., mBio, vol. 12, No. 1, pp. 1-19.

* cited by examiner

*Primary Examiner* — Nianxiang Zou
(74) *Attorney, Agent, or Firm* — ScienBiziP, P.C.

(57) ABSTRACT

A vaccine combination may include first and second vaccines. The first vaccine may include a first fusion protein or a first polynucleotide encoding the first fusion protein. The first fusion protein may include an E7 protein of HPV-16; an E7 protein of HPV-18; an E6 protein of HPV-16; an E6 protein of HPV-18; and a heat shock protein. The second vaccine may include second and third fusion proteins, or a second polynucleotide encoding the second and third fusion proteins. The second fusion protein may include an E6 protein of HPV-16 and an E7 protein of HPV-16. The third fusion protein may include an E6 protein of HPV-18 and an E7 protein of HPV-18. A functional variant may be employed for one or more of the proteins. An amino acid sequence of junction regions in the first fusion protein may be different from those in the second and third fusion proteins.

16 Claims, 7 Drawing Sheets

Specification includes a Sequence Listing.

SEQUENCE LISTING

<160> NUMBER OF SEQ ID NOS: 18

<210> SEQ ID NO 1
<211> LENGTH: 8
<212> TYPE: PRT

```
<213> ORGANISM: Artificial Sequence
<220> FEATURE:
<223> OTHER INFORMATION: HPV16 E7

<400> SEQUENCE: 1

Met His Gly Asp Thr Pro Thr Leu
1               5

<210> SEQ ID NO 2
<211> LENGTH: 8
<212> TYPE: PRT
<213> ORGANISM: Artificial Sequence
<220> FEATURE:
<223> OTHER INFORMATION: HPV16 E7

<400> SEQUENCE: 2

Gly Pro Ile Cys Ser Gln Lys Pro
1               5

<210> SEQ ID NO 3
<211> LENGTH: 8
<212> TYPE: PRT
<213> ORGANISM: Artificial Sequence
<220> FEATURE:
<223> OTHER INFORMATION: HPV18 E7

<400> SEQUENCE: 3

Met His Gly Pro Lys Ala Thr Leu
1               5

<210> SEQ ID NO 4
<211> LENGTH: 8
<212> TYPE: PRT
<213> ORGANISM: Artificial Sequence
<220> FEATURE:
<223> OTHER INFORMATION: HPV18 E7

<400> SEQUENCE: 4

Gly Pro Trp Cys Ala Ser Gln Gln
1               5

<210> SEQ ID NO 5
<211> LENGTH: 8
<212> TYPE: PRT
<213> ORGANISM: Artificial Sequence
<220> FEATURE:
<223> OTHER INFORMATION: HPV16 E6

<400> SEQUENCE: 5

Met His Gln Lys Arg Thr Ala Met
1               5

<210> SEQ ID NO 6
<211> LENGTH: 8
<212> TYPE: PRT
<213> ORGANISM: Artificial Sequence
<220> FEATURE:
<223> OTHER INFORMATION: HPV16 E6

<400> SEQUENCE: 6

Cys Cys Arg Ser Ser Arg Thr Arg
1               5

<210> SEQ ID NO 7
<211> LENGTH: 8
<212> TYPE: PRT
<213> ORGANISM: Artificial Sequence
```

```
<220> FEATURE:
<223> OTHER INFORMATION: HPV18 E6

<400> SEQUENCE: 7

Met Ala Arg Phe Glu Asp Pro Thr
1               5

<210> SEQ ID NO 8
<211> LENGTH: 8
<212> TYPE: PRT
<213> ORGANISM: Artificial Sequence
<220> FEATURE:
<223> OTHER INFORMATION: HPV18 E6

<400> SEQUENCE: 8

Arg Gln Glu Arg Leu Gln Arg Arg
1               5

<210> SEQ ID NO 9
<211> LENGTH: 98
<212> TYPE: PRT
<213> ORGANISM: Artificial Sequence
<220> FEATURE:
<223> OTHER INFORMATION: HPV16 E7

<400> SEQUENCE: 9

Met His Gly Asp Thr Pro Thr Leu His Glu Tyr Met Leu Asp Leu Gln
1               5                   10                  15

Pro Glu Thr Thr Asp Leu Tyr Gly Tyr Gly Gln Leu Asn Asp Ser Ser
            20                  25                  30

Glu Glu Glu Asp Glu Ile Asp Gly Pro Ala Gly Gln Ala Glu Pro Asp
        35                  40                  45

Arg Ala His Tyr Asn Ile Val Thr Phe Cys Cys Lys Cys Asp Ser Thr
    50                  55                  60

Leu Arg Leu Cys Val Gln Ser Thr His Val Asp Ile Arg Thr Leu Glu
65                  70                  75                  80

Asp Leu Leu Met Gly Thr Leu Gly Ile Val Gly Pro Ile Cys Ser Gln
                85                  90                  95

Lys Pro

<210> SEQ ID NO 10
<211> LENGTH: 105
<212> TYPE: PRT
<213> ORGANISM: Artificial Sequence
<220> FEATURE:
<223> OTHER INFORMATION: HPV18 E7

<400> SEQUENCE: 10

Met His Gly Pro Lys Ala Thr Leu Gln Asp Ile Val Leu His Leu Glu
1               5                   10                  15

Pro Gln Asn Glu Ile Pro Val Asp Leu Leu Gly His Gly Gln Leu Ser
            20                  25                  30

Asp Ser Glu Glu Glu Asn Asp Glu Ile Asp Gly Val Asn His Gln His
        35                  40                  45

Leu Pro Ala Arg Arg Ala Glu Pro Gln Arg His Thr Met Leu Cys Met
    50                  55                  60

Cys Cys Lys Cys Glu Ala Arg Ile Glu Leu Val Val Glu Ser Ser Ala
65                  70                  75                  80

Asp Asp Leu Arg Ala Phe Gln Gln Leu Phe Leu Asn Thr Leu Ser Phe
                85                  90                  95
```

```
Val Gly Pro Trp Cys Ala Ser Gln Gln
                100                 105
```

<210> SEQ ID NO 11
<211> LENGTH: 153
<212> TYPE: PRT
<213> ORGANISM: Artificial Sequence
<220> FEATURE:
<223> OTHER INFORMATION: HPV16 E6

<400> SEQUENCE: 11

```
Met His Gln Lys Arg Thr Ala Met Phe Gln Asp Pro Gln Glu Arg Pro
1               5                   10                  15

Arg Lys Leu Pro Gln Leu Cys Thr Glu Leu Gln Thr Thr Ile His Asp
            20                  25                  30

Ile Ile Leu Glu Cys Val Tyr Cys Lys Gln Gln Leu Leu Arg Arg Glu
        35                  40                  45

Val Tyr Asp Phe Ala Phe Arg Asp Leu Cys Ile Val Tyr Arg Asp Gly
    50                  55                  60

Asn Pro Tyr Ala Val Gly Asp Lys Cys Leu Lys Phe Tyr Ser Lys Ile
65                  70                  75                  80

Ser Glu Tyr Arg His Tyr Cys Tyr Ser Leu Tyr Gly Thr Thr Leu Glu
                85                  90                  95

Gln Gln Tyr Asn Lys Pro Leu Cys Asp Leu Leu Ile Arg Cys Ile Asn
            100                 105                 110

Gly Gln Lys Pro Leu Cys Pro Glu Glu Lys Gln Arg His Leu Asp Lys
        115                 120                 125

Lys Gln Arg Phe His Asn Ile Arg Gly Arg Trp Thr Gly Arg Cys Met
    130                 135                 140

Ser Cys Cys Arg Ser Ser Arg Thr Arg
145                 150
```

<210> SEQ ID NO 12
<211> LENGTH: 153
<212> TYPE: PRT
<213> ORGANISM: Artificial Sequence
<220> FEATURE:
<223> OTHER INFORMATION: HPV18 E6

<400> SEQUENCE: 12

```
Met Ala Arg Phe Glu Asp Pro Thr Arg Arg Pro Tyr Lys Leu Pro Asp
1               5                   10                  15

Leu Cys Thr Glu Leu Asn Thr Ser Leu Gln Asp Ile Glu Ile Thr Cys
            20                  25                  30

Val Tyr Cys Lys Thr Val Leu Glu Leu Thr Glu Val Phe Glu Phe Ala
        35                  40                  45

Phe Lys Asp Leu Phe Val Val Tyr Arg Asp Ser Ile Pro His Ala Ala
    50                  55                  60

Gly His Lys Cys Ile Asp Phe Tyr Ser Arg Ile Arg Glu Leu Arg His
65                  70                  75                  80

Tyr Ser Asp Ser Val Tyr Gly Asp Thr Leu Glu Lys Leu Thr Asn Thr
                85                  90                  95

Gly Leu Tyr Asn Leu Leu Ile Arg Cys Leu Arg Gly Gln Lys Pro Leu
            100                 105                 110

Asn Pro Ala Glu Lys Leu Arg His Leu Asn Glu Lys Arg Arg Phe His
        115                 120                 125

Asn Ile Ala Gly His Tyr Arg Gly Gln Cys His Ser Cys Cys Asn Arg
    130                 135                 140
```

Ala Arg Gln Glu Arg Leu Gln Arg Arg
145             150

<210> SEQ ID NO 13
<211> LENGTH: 294
<212> TYPE: DNA
<213> ORGANISM: Artificial Sequence
<220> FEATURE:
<223> OTHER INFORMATION: Optimized HPV16 E7(detox) DNA sequence

<400> SEQUENCE: 13

```
atgcacgggg atacacccac actgcacgag tacatgctgg atctgcagcc cgagaccacc    60
gacctgtacg gctacggcca gctgaacgat tccagcgagg aggaggatga gattgacggg   120
cccgccggcc aggccgagcc cgatagggcc cactacaaca tcgtgacatt ctgctgcaag   180
tgcgatagca ccctgaggct gtgcgtccag agcacccacg tggacatcag gacactggag   240
gacctgctga tgggcaccct ggggatcgtg gggcccatct gcagccagaa gccc          294
```

<210> SEQ ID NO 14
<211> LENGTH: 315
<212> TYPE: DNA
<213> ORGANISM: Artificial Sequence
<220> FEATURE:
<223> OTHER INFORMATION: Optimized HPV18 E7(detox) DNA sequence

<400> SEQUENCE: 14

```
atgcacggcc ctaaggccac cctgcaggac atcgtgctgc acctggagcc tcagaacgag    60
atccccgtgg acctgctggg gcacggccag ctgtccgatt ccgaggagga gaacgatgag   120
attgacggag tgaaccacca gcacctgcct gctaggaggg ccgaacccca gcggcacaca   180
atgctgtgca tgtgttgcaa gtgtgaggcc cggatcgagc tggtggtgga gagctcagcc   240
gatgacctgc gggccttcca gcagctgttc ctgaacacac tgagctttgt ggggccctgg   300
tgcgccagcc agcag                                                     315
```

<210> SEQ ID NO 15
<211> LENGTH: 459
<212> TYPE: DNA
<213> ORGANISM: Artificial Sequence
<220> FEATURE:
<223> OTHER INFORMATION: Optimized HPV16 E6(detox) DNA sequence

<400> SEQUENCE: 15

```
atgcaccaga gaggacagc catgttccag accccagg agcggccgag gaagctgccc      60
caactgtgca ccgagctgca gacaaccatc cacgacatca tcctggagtg cgtgtactgc   120
aagcagcagc tgctgaggag agaggtctac gattttgcct ttagagacct gtgcattgtg   180
taccgggatg gcaacccata cgccgtgggg gataaatgtt tgaagtttta cagcaagatt   240
tctgagtaca gacattactg ttattccctg tacggaacta cactggagca gcagtacaac   300
aagcccctgt gcgatctgct gattagatgc attaacggcc agaagccact gtgccctgag   360
gagaagcaga gacatctgga taagaagcag cggttccata acattagagg aagatggaca   420
ggcaggtgca tgtcatgctg cagaagctcc aggaccagg                          459
```

<210> SEQ ID NO 16
<211> LENGTH: 459
<212> TYPE: DNA
<213> ORGANISM: Artificial Sequence
<220> FEATURE:
<223> OTHER INFORMATION: Optimized HPV18 E6(detox) DNA sequence

<400> SEQUENCE: 16

```
atggcccggt tgaggaccc cacaaggagg ccctacaagc tgcctgacct gtgcacagag      60
ctaaacacaa gcctccagga tattgagatc acctgcgtgt actgcaagac agtcctggag     120
ctgaccgagg tgttcgagtt cgcctttaag gatctgttcg tggtgtaccg ggatagcatc     180
ccccacgccg ccggccacaa gtgcatcgac ttctacagca ggatccggga gctgaggcac     240
tacagcgata gcgtgtacgg ggacacactg gagaagctga ccaacacagg gctgtacaac     300
ctgctgatcc ggtgcctgag ggggcagaag ccctgaacc cgccgagaa gctgaggcac      360 ctgaacgaga gaggcggtt ccacaacatc gccgggcact acaggggcca gtgccacagc     420
tgctgcaaca gggccaggca ggagaggctg cagcggcgc                            459
```

<210> SEQ ID NO 17
<211> LENGTH: 3422
<212> TYPE: DNA
<213> ORGANISM: Artificial Sequence
<220> FEATURE:
<223> OTHER INFORMATION: pBI-11 DNA Sequence

<400> SEQUENCE: 17

```
atggcggccc ccggcgcccg gcggccgctg ctcctgctgc tgctggcagg ccttgcacat      60
ggcgcctcag cactctttga ggatctaatc atgcacgggg atacccac actgcacgag     120 tacatgctgg atctgcagcc cgagaccacc gacctgtacg gctacggcca gctgaacgat     180
tccagcgagg aggaggatga gattgacggg cccgccggcc aggccgagcc cgataggggc     240
cactacaaca tcgtgacatt ctgctgcaag tgcgatagca ccctgaggct gtgcgtccag     300
agcacccacg tggacatcag gacactggag gacctgctga tgggcaccct ggggatcgtg     360
gggcccatct gcagccagaa gcccatgcac ggccctaagg ccaccctgca ggacatcgtg     420
ctgcacctgg agcctcagaa cgagatcccc gtggacctgc tggggcacgg ccagctgtcc     480
gattccgagg aggagaacga tgagattgac ggagtgaacc accagcacct gcctgctagg     540
agggccgaac cccagcggca cacaatgctg tgcatgtgtt gcaagtgtga ggcccggatc     600
gagctggtgg tggagagctc agccgatgac ctgcgggcct tccagcagct gttcctgaac     660
acactgagct ttgtggggcc ctggtgcgcc agccagcaga tgcaccagaa gaggacagcc     720
atgttccagg accccagga gcggccgagg aagctgcccc aactgtgcac cgagctgcag     780
acaaccatcc acgacatcat cctggagtgc gtgtactgca agcagcagct gctgaggaga     840
gaggtctacg attttgcctt tagagacctg tgcattgtgt accgggatgg caacccatac     900
gccgtggggg ataaatgttt gaagttttac agcaagattt ctgagtacag acattactgt     960
tattccctgt acggaactac actggagcag cagtacaaca gcccctgtg cgatctgctg    1020 attagatgca ttaacggcca gaagccactg tgccctgagg agaagcagag acatctggat    1080
aagaagcagc ggttccataa cattagagga agatggacag gcaggtgcat gtcatgctgc    1140
agaagctcca ggaccaggat ggcccggttt gaggaccca aggaggcc ctacaagctg       1200 cctgacctgt gcacagagct aaacacaagc ctccaggata ttgagatcac ctgcgtgtac    1260
tgcaagacag tcctggagct gaccgaggtg ttcgagttcg cctttaagga tctgttcgtg    1320
gtgtaccggg atagcatccc ccacgccgcc ggccacaagt gcatcgactt ctacagcagg    1380
atccgggagc tgaggcacta cagcgatagc gtgtacgggg acacactgga gaagctgacc    1440
aacacagggc tgtacaacct gctgatccgg tgcctgaggg ggcagaagcc cctgaacccc    1500
```

| | |
|---|---|
| gccgagaagc tgaggcacct gaacgagaag aggcggttcc acaacatcgc cgggcactac | 1560 |
| aggggccagt gccacagctg ctgcaacagg gccaggcagg agaggctgca gcggcgcatg | 1620 |
| gctcgtgcgg tcgggatcga cctcgggacc accaactccg tcgtctcggt tctggaaggt | 1680 |
| ggcgacccgt tcgtcgtcgc caactccgag ggctccagga ccaccccgtc aattgtcgcg | 1740 |
| ttcgcccgca acggtgaggt gctggtcggc cagcccgcca agaaccaggc ggtgaccaac | 1800 |
| gtcgatcgca ccgtgcgctc ggtcaagcga cacatgggca gcgactggtc catagagatt | 1860 |
| gacggcaaga aatacaccgc gccggagatc agcgcccgca ttctgatgaa gctgaagcgc | 1920 |
| gacgccgagg cctacctcgg tgaggacatt accgacgcgg ttatcacgac gcccgcctac | 1980 |
| ttcaatgacg cccagcgtca ggccaccaag gacgccggcc agatcgccgg cctcaacgtg | 2040 |
| ctgcggatcg tcaacgagcc gaccgcggcc gcgctggcct acggcctcga caagggcgag | 2100 |
| aaggagcagc gaatcctggt cttcgacttg ggtggtggca ctttcgacgt tcccctgctg | 2160 |
| gagatcggcg agggtgtggt tgaggtccgt gccacttcgg gtgacaacca cctcggcggc | 2220 |
| gacgactggg accagcgggt cgtcgattgg ctggtggaca agttcaaggg caccagcggc | 2280 |
| atcgatctga ccaaggacaa gatggcgatg cagcggctgc gggaagccgc cgagaaggca | 2340 |
| aagatcgagc tgagttcgag tcagtccacc tcgatcaacc tgccctacat caccgtcgac | 2400 |
| gccgacaaga acccgttgtt cttagacgag cagctgaccc gcgcggagtt ccaacggatc | 2460 |
| actcaggacc tgctggaccg cactcgcaag ccgttccagt cggtgatcgc tgacaccggc | 2520 |
| atttcggtgt cggagatcga tcacgttgtg ctcgtgggtg gttcgacccg gatgcccgcg | 2580 |
| gtgaccgatc tggtcaagga actcaccggc ggcaaggaac ccaacaaggg cgtcaacccc | 2640 |
| gatgaggttg tcgcggtggg agccgctctg caggccggcg tcctcaaggg cgaggtgaaa | 2700 |
| gacgttctgc tgcttgatgt taccccgctg agcctgggta tcgagaccaa gggcggggtg | 2760 |
| atgaccaggc tcatcgagcg caacaccacg atccccacca agcggtcgga ctttcacc | 2820 |
| accgccgaca caaccaacc gtcggtgcag atccaggtct atcaggggga gcgtgagatc | 2880 |
| gccgcgcaca acaagttgct cgggtccttc gagctgaccg gcatcccgcc ggcgccgcgg | 2940 |
| gggattccgc agatcgaggt cactttcgac atcgacgcca acggcattgt gcacgtcacc | 3000 |
| gccaaggaca agggcaccgg caaggagaac acgatccgaa tccaggaagg ctcgggcctg | 3060 |
| tccaaggaag acattgaccg catgatcaag gacgccgaag cgcacgccga ggaggatcgc | 3120 |
| aagcgtcgcg aggaggccga tgttcgtaat caagccgaga cattggtcta ccagacggag | 3180 |
| aagttcgtca agaacagcg tgaggccgag ggtggttcga aggtacctga agacacgctg | 3240 |
| aacaaggttg atgccgcggt ggcggaagcg aaggcggcac ttggcggatc ggatatttcg | 3300 |
| gccatcaagt cggcgatgga gaagctgggc caggagtcgc aggctctggg caagcgatc | 3360 |
| tacgaagcag ctcaggctgc gtcacaggcc actggcgctg cccaccccgg ctcggctgat | 3420 |
| ga | 3422 |

<210> SEQ ID NO 18
<211> LENGTH: 3422
<212> TYPE: DNA
<213> ORGANISM: Artificial Sequence
<220> FEATURE:
<223> OTHER INFORMATION: pBI-12 DNA Sequence

<400> SEQUENCE: 18

| | |
|---|---|
| atggccgccc caggagctag aaggccactt ttgttgctgt tgctggccgg attagcccat | 60 |
| ggagctagcg ctctgtttga ggatctgatc atgcacgggg atacacccac actgcacgag | 120 |

```
tacatgctgg atctgcagcc cgagaccacc gacctgtacg gctacggcca gctgaacgat    180
tccagcgagg aggaggatga gattgacggg cccgccggcc aggccgagcc cgatagggcc    240
cactacaaca tcgtgacatt ctgctgcaag tgcgatagca ccctgaggct gtgcgtccag    300
agcacccacg tggacatcag gacactggag gacctgctga tgggcaccct ggggatcgtg    360
gggcccatct gcagccagaa gcccatgcac ggccctaagg ccaccctgca ggacatcgtg    420
ctgcacctgg agcctcagaa cgagatcccc gtggacctgc tggggcacgg ccagctgtcc    480
gattccgagg aggagaacga tgagattgac ggagtgaacc accagcacct gcctgctagg    540
agggccgaac cccagcggca cacaatgctg tgcatgtgtt gcaagtgtga ggcccggatc    600
gagctggtgg tggagagctc agccgatgac ctgcgggcct tccagcagct gttcctgaac    660
acactgagct ttgtggggcc ctggtgcgcc agccagcaga tgcaccagaa gaggacagcc    720
atgttccagg accccaggag gcggccgagg aagctgcccc aactgtgcac cgagctgcag    780
acaaccatcc acgacatcat cctggagtgc gtgtactgca gcagcagct gctgaggaga    840 gaggtctacg attttgcctt tagagacctg tgcattgtgt accgggatgg caacccatac    900
gccgtggggg ataaatgttt gaagttttac agcaagattt ctgagtacag acattactgt    960
tattccctgt acggaactac actggagcag cagtacaaca gcccctgtg cgatctgctg   1020 attagatgca ttaacggcca gaagccactg tgccctgagg agaagcagag acatctggat   1080
aagaagcagc ggttccataa cattagagga agatggacag gcaggtgcat gtcatgctgc   1140
agaagctcca ggaccaggat ggcccggttt gaggacccca caaggaggcc ctacaagctg   1200
cctgacctgt gcacagagct aaacacaagc ctccaggata ttgagatcac ctgcgtgtac   1260
tgcaagacag tcctggagct gaccgaggtg ttcgagttcg cctttaagga tctgttcgtg   1320
gtgtaccggg atagcatccc ccacgccgcc ggccacaagt gcatcgactt ctacagcagg   1380
atccgggagc tgaggcacta cagcgatagc gtgtacgggg acacactgga gaagctgacc   1440
aacacagggc tgtacaacct gctgatccgg tgcctgaggg ggcagaagcc cctgaacccc   1500
gccgagaagc tgaggcacct gaacgagaag aggcggttcc acaacatcgc cgggcactac   1560
aggggccagt gccacagctg ctgcaacagg gccaggcagg agaggctgca gcggcgcatg   1620
gctcgtgcgg tcgggatcga cctcgggacc accaactccg tcgtctcggt tctggaaggt   1680
ggcgacccgg tcgtcgtcgc caactccgag ggctccagga ccaccccgtc aattgtcgcg   1740
ttcgcccgca cggtgaggt gctggtcggc cagcccgcca agaaccaggc ggtgaccaac   1800
gtcgatcgca ccgtgcgctc ggtcaagcga cacatgggca gcgactggtc catagagatt   1860
gacggcaaga atacaccgc gccggagatc agcgcccgca ttctgatgaa gctgaagcgc   1920
gacgccgagg cctacctcgg tgaggacatt accgacgcgg ttatcacgac gcccgcctac   1980
ttcaatgacg cccagcgtca ggccaccaag gacgccggcc agatcgccgg cctcaacgtg   2040
ctgcggatcg tcaacgagcc gaccgcggcc gcgctggcct acggcctcga caagggcgag   2100
aaggagcagc gaatcctggt cttcgacttg ggtggtggca ctttcgacgt ttccctgctg   2160
gagatcggcg agggtgtggt tgaggtccgt gccacttcgg tgacaaccca cctcggcggc   2220
gacgactggg accagcgggt cgtcgattgg ctggtggaca agttcaaggg caccagcggc   2280
atcgatctga ccaaggacaa gatggcgatg cagcggctgc gggaagccgc cgagaaggca   2340
aagatcgagc tgagttcgag tcagtccacc tcgatcaacc tgccctacat caccgtcgac   2400
gccgacaaga acccgttgtt cttagacgag cagctgaccc gcgcggagtt ccaacggatc   2460
```

```
actcaggacc tgctggaccg cactcgcaag ccgttccagt cggtgatcgc tgacaccggc    2520
atttcggtgt cggagatcga tcacgttgtg ctcgtgggtg gttcgacccg gatgcccgcg    2580
gtgaccgatc tggtcaagga actcaccggc ggcaaggaac ccaacaaggg cgtcaacccc    2640
gatgaggttg tcgcggtggg agccgctctg caggccggcg tcctcaaggg cgaggtgaaa    2700
gacgttctgc tgcttgatgt tacccgctg agcctgggta tcgagaccaa gggcggggtg    2760
atgaccaggc tcatcgagcg caacaccacg atccccacca agcggtcgga gactttcacc    2820
accgccgacg acaaccaacc gtcggtgcag atccaggtct atcagggga gcgtgagatc    2880 gccgcgcaca acaagttgct cgggtccttc gagctgaccg gcatcccgcc ggcgccgcgg    2940
gggattccgc agatcgaggt cactttcgac atcgacgcca acggcattgt gcacgtcacc    3000
gccaaggaca agggcaccgg caaggagaac acgatccgaa tccaggaagg ctcgggcctg    3060
tccaaggaag acattgaccg catgatcaag gacgccaag cgcacgccga ggaggatcgc    3120
aagcgtcgcg aggaggccga tgttcgtaat caagccgaga cattggtcta ccagacggag    3180
aagttcgtca aagaacagcg tgaggccgag ggtggttcga aggtacctga agacacgctg    3240
aacaaggttg atgccgcggt ggcggaagcg aaggcggcac ttggcggatc ggatatttcg    3300
gccatcaagt cggcgatgga gaagctgggc caggagtcgc aggctctggg gcaagcgatc    3360
tacgaagcag ctcaggctgc gtcacaggcc actggcgctg cccacccggg ctcggctgat    3420
ga                                                                    3422
```

VACCINE COMBINATION AND METHOD FOR USING THE SAME

REFERENCE TO SEQUENCE LISTING

Accompanying this application is a sequence listing in an American Standard Code for Information Interchange (ASCII) text file named "211223-US86679-Sequence-Listing-v1F", created Dec. 7, 2021, and having a size of 18,253 bytes. The sequence listing is hereby fully incorporated by reference herein.

STATEMENT REGARDING PRIOR DISCLOSURES BY THE INVENTOR UNDER 37 C.F.R. 1.77(b)(6)

A prior disclosure, "Development of DNA Vaccine Targeting E6 and E7 Proteins of Human Papillomavirus 16 (HPV16) and HPV18 for Immunotherapy in Combination with Recombinant Vaccinia Boost and PD-1 Antibody," mBio, January/February 2021, Volume 12, Issue 1, pages 1-19, published Jan. 19, 2021, discusses work related to the claimed subject matter of this application. The inventor of the present application, Yung-Nien Chang, unequivocally states that he is the sole inventor of the subject matter discussed in the prior disclosure and that he provided key materials to conduct experiments related to the prior disclosure. The inventor is also a co-author of the prior disclosure. The remaining co-authors of the prior disclosure conducted and recorded various aspects of the experiments under the direction of the inventor, and thus contributed to the prior disclosure in that capacity. A copy of the prior disclosure is provided in association with an Information Disclosure Statement submitted in conjunction with this application.

BACKGROUND

1. Field

The present disclosure generally relates to vaccine combinations, particularly for a human papillomavirus (HPV)-associated disease, and more specifically to improving the vaccine combination by the particular design of a priming vaccine and a boosting vaccine.

2. Related Art

HPV is a common etiological agent in several human cancers, including cervical, anal, penile, vulvar, vaginal, and head and neck cancers. Current vaccines against HPV, such as Gardasil® and Cervarix®, have shown clinical efficacy in preventing HPV infection, but they are ineffective in treating patients with existing HPV infection or HPV-associated cancers. As such, development of therapeutic vaccines for patients infected with HPV or even suffering from HPV-associated diseases are highly demanded.

Deoxyribonucleic acid (DNA) vaccination is a technique for protecting against infection or treating disease by injection with a genetically engineered plasmid containing a DNA sequence encoding one or more antigens. DNA vaccines have theoretical advantages over conventional vaccines, including safety, speed, and predictability of manufacture; temperature stability; flexibility in design; and the ability to induce a wider range of immune response types.

An effective vaccine usually requires more than one-time immunization in the form of prime-boost. Traditionally the same vaccines are given multiple times as homologous boosts. Some findings suggest that prime-boost can be done with different types of vaccines containing the same antigens. In many cases such heterologous prime-boost can be more immunogenic than homologous prime-boost (*Curr Opin Immunol.* 2009 June; 21(3): 346-351). Heterologous prime-boost may include administration of two different vectors or delivery systems expressing the same or overlapping antigenic inserts. It has been known that using certain vector combinations could increase both antibody and T cell immunity. However, while a priming vaccine and a boosting vaccine, which both can be either a fusion protein of antigens or a vector encoding the same, may have the same antigen arrangement in the fusion protein, the enhanced immunity generated by the prime-boost regimen may also include boosting an immune response against the junction-associated epitopes in the fusion protein of antigens and may lead to an impaired immune response against the target pathogen or other undesired effects.

Furthermore, before providing a newly developed DNA vaccine to the clinics, the potential to induce autoimmunity by vaccinating with novel sequences is a great concern that should be addressed. Such adverse reaction to vaccines may be viewed as a result of the interaction between susceptibility of the vaccinated subject and various vaccine components. The significant similarity between certain pathogenic elements contained in the vaccine and specific human proteins may lead to immune cross-reactivity, wherein the reaction of the immune system towards the pathogenic antigens may harm the similar human proteins (self-antigens), essentially causing autoimmune disease (*Cell Mol Immunol.* 2018 June; 15(6):586-594). Therefore, in addition to elevating the immunogenicity of vaccines, it is essential as well to avoid potential induction of autoimmunity due to cross-reactivity when developing vaccines.

In view of the reasons mentioned above, there exists an unmet need for providing a vaccine for treating HPV-associated diseases with enhanced immunogenicity and improved safety, as reflected in a reduced risk to generate an immune response against the junction-associated epitopes potentially in the fusion protein expressed by or contained in the vaccine and to induce cross-reactivity against self-antigens.

BRIEF SUMMARY OF THE DISCLOSURE

In a first aspect of the present disclosure, a vaccine combination may be provided. The vaccine combination may include a first vaccine and a second vaccine. The first vaccine may include a first fusion protein or a first polynucleotide encoding the first fusion protein. The first fusion protein, in an order from N to C terminus, may include: (i) an E7 protein of human papillomavirus type 16 (HPV-16) or a functional variant thereof; (ii) an E7 protein of human papillomavirus type 18 (HPV-18) or a functional variant thereof; (iii) an E6 protein of HPV-16 or a functional variant thereof; (iv) an E6 protein of HPV-18 or a functional variant thereof; and (v) a heat shock protein or a functional variant thereof. The E7 protein of HPV-16 or a functional variant thereof may comprise SEQ ID NO: 1 at a beginning of the protein and SEQ ID NO: 2 at an end of the protein. The E7 protein of HPV-18 or a functional variant thereof may comprise SEQ ID NO: 3 at a beginning of the protein and SEQ ID NO: 4 at an end of the protein. The E6 protein of HPV-16 or a functional variant thereof may comprise SEQ ID NO: 5 at a beginning of the protein and SEQ ID NO: 6 at an end of the protein. The E6 protein of HPV-18 or a functional variant thereof may comprise SEQ ID NO: 7 at a beginning of the protein and SEQ ID NO: 8 at an end of the protein. The second vaccine may include a second fusion protein and a third fusion protein, or a second polynucleotide encoding the second fusion protein and the third fusion protein. The second fusion protein may include an E6 protein of HPV-16 or a functional variant thereof; and an E7 protein of HPV-16 or a functional variant thereof. The third fusion protein may include an E6 protein of HPV-18 or a functional variant thereof; and an E7 protein of HPV-18 or a functional variant thereof. An amino acid sequence of junction regions in the first fusion protein may be different from those in the second fusion protein and the third fusion protein.

In some embodiments, the E7 protein of HPV-16 may comprise SEQ ID NO: 9; the E7 protein of HPV-18 may comprise SEQ ID NO: 10; the E6 protein of HPV-16 may comprise SEQ ID NO: 11; and the E6 protein of HPV-18 may comprise SEQ ID NO: 12.

In some embodiments, the E7 protein of HPV-16 may be encoded by SEQ ID NO: 13; the E7 protein of HPV-18 may be encoded by SEQ ID NO: 14; the E6 protein of HPV-16 may be encoded by SEQ ID NO: 15; and the E6 protein of HPV-18 may be encoded by SEQ ID NO: 16.

In some embodiments, the first polynucleotide may include SEQ ID NO: 17.

In some embodiments, the first polynucleotide may include SEQ ID NO: 18.

In some embodiments, the second polynucleotide may be contained within a recombinant virus.

In some embodiments, the recombinant virus may be therapeutic antigen HPV (TA-HPV).

In a second aspect of the present disclosure, a method for treating an HPV-associated disease in a subject in need thereof may be provided. The method may include administering the aforementioned vaccine combination to the subject. The first vaccine may be administered as a priming vaccine, and the second vaccine may be administered as a boosting vaccine.

In some embodiments, the method may further include administering the first vaccine to the subject as a boosting vaccine after the administration of the first vaccine as a priming vaccine and prior to the administration of the second vaccine as a boosting vaccine.

In some embodiments, the first vaccine may comprise the first polynucleotide. In some embodiments, the first vaccine may be administered at a dose ranging from 10 micrograms per subject to 20 milligrams per subject.

In some embodiments, the second vaccine may comprise TA-HPV. In some embodiments, the second vaccine may be administered at a dose ranging from $1\times10^4$ plaque-forming units (pfu) to $2\times10^9$ pfu.

In some embodiments, the method may further include administering a chemotherapy, radiotherapy, chemo-radiotherapy, cryotherapy, thermotherapy, targeted therapy, cellular therapy, gene therapy, or immunotherapy in combination with the administration of the vaccine combination.

In some embodiments, the chemotherapy, radiotherapy, chemo-radiotherapy, cryotherapy, thermotherapy, targeted therapy, cellular therapy, gene therapy, or immunotherapy may be administered prior to and/or simultaneously with the administration of the first vaccine.

In some embodiments, the immunotherapy may comprise administering an immune checkpoint inhibitor to the subject.

In some embodiments, the immune checkpoint inhibitor may be an immune modulator targeting PD-1, PD-L1, CTLA-4, ICOS, TIM-3, LAG-3 or TIGIT.

In some embodiments, the immune checkpoint inhibitor may be an anti-PD-1 antibody.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

In accordance with common practice, the various described features are not drawn to scale and are drawn to emphasize features relevant to the present disclosure. Like reference characters denote like elements throughout the figures and text.

DETAILED DESCRIPTION

Figure 1A:
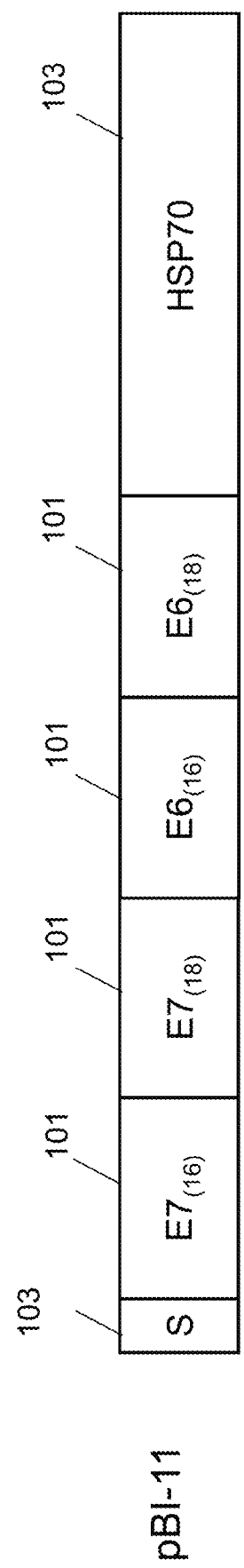
FIG. 1A is a schematic illustration showing a DNA construct encoding the first fusion protein of the first vaccine of the vaccine combination according to an embodiment of the present disclosure.

The present disclosure will now be described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these exemplary embodiments are provided so that this disclosure will be thorough and complete, and will fully convey the scope of the disclosure to those skilled in the art. Like reference numerals refer to like elements throughout.

The terminology used herein is for the purpose of describing particular exemplary embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," or "includes" and/or "including" or "has" and/or "having", when used herein, specify the presence of stated features, regions, integers, steps, operations, elements, and/or components, but do not preclude the presence or addition of one or more other features, regions, integers, steps, operations, elements, components, and/or groups thereof.

The term "functional variant", as used herein, refers to a protein (i) having at least about 80%, 85%, 90%, 95%, 96%, 97%, 98%, 99% or more identical in amino acid sequence to the wild-type protein; and (ii) retaining the immunogenicity of the wild-type protein, for example, the ability to induce protein-specific CD8$^+$ T cells.

The term "in combination with", as used herein, includes the administration of two or more vaccines or therapeutic agents simultaneously, or sequentially in any order within no specific time limits, unless otherwise indicated, in the course of treating the same disease in the same patient.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

A vaccine combination of the present disclosure is provided for a subject having a human papillomavirus (HPV)-associated disease. The subject having an HPV-associated disease may be a mammal (e.g., human, mice, etc.) suffering from, but not limited to, warts, papilloma, intraepithelial neoplasia, penile cancer, vaginal cancer, vulva cancer, anal cancer, oropharyngeal cancer, non-melanoma skin cancer, conjunctival cancer, or cervical cancer.

The vaccine combination may include a first vaccine and a second vaccine. The first vaccine includes a first fusion protein or a first polynucleotide that is designed to encode the first fusion protein. The first fusion protein includes a plurality of HPV antigens and a heat shock protein having a specific arrangement and thereby encompasses specific junction regions between the HPV antigens and between the HPV antigen and the heat shock protein. The second vaccine includes a second fusion protein and a third fusion protein, or a second polynucleotide that is designed to encode the second fusion protein and the third fusion protein. The second fusion protein includes two HPV antigens having a specific arrangement and thereby encompasses a specific junction region between the HPV antigens. The third fusion protein also includes two HPV antigens having a specific arrangement and thereby encompasses a specific junction region between the HPV antigens. The amino acid sequence of the junction regions in the first fusion protein are different from those in the second fusion protein and the third fusion protein.

Specifically, the specific arrangement of HPV antigens of the first fusion protein, the second fusion protein and the third fusion protein are described as follows:

The first fusion protein, in an order from N to C terminus, may include (i) an E7 protein of human papillomavirus type 16 (HPV-16) or a functional variant thereof, wherein the E7 protein of HPV-16 or a functional variant thereof comprises SEQ ID NO: 1 at the beginning of the protein and SEQ ID NO: 2 at the end of the protein; (ii) an E7 protein of human papillomavirus type 18 (HPV-18) or a functional variant thereof, wherein the E7 protein of HPV-18 or a functional variant thereof comprises SEQ ID NO: 3 at the beginning of the protein and SEQ ID NO: 4 at the end of the protein; (iii) an E6 protein of HPV-16 or a functional variant thereof, wherein the E6 protein of HPV-16 or a functional variant thereof comprises SEQ ID NO: 5 at the beginning of the protein and SEQ ID NO: 6 at the end of the protein; (iv) an E6 protein of HPV-18 or a functional variant thereof, wherein the E6 protein of HPV-18 or a functional variant thereof comprises SEQ ID NO: 7 at the beginning of the protein and SEQ ID NO: 8 at the end of the protein; and (v) a heat shock protein or a functional variant thereof. Thereby, junctions are formed between the adjacent HPV antigens (e.g., E7 protein of HPV-16 and E7 protein HPV-18; E7 protein HPV-18 and E6 protein of HPV-16; and E6 protein of HPV-16 and E6 protein HPV-18) and between the E6 protein of HPV-18 and the heat shock protein in the first fusion protein.

The second fusion protein, in an order from N to C terminus, may include an E6 protein of HPV-16 or a functional variant thereof; and an E7 protein of HPV-16 or a functional variant thereof. The third fusion protein, in an order from N to C terminus, may include an E6 protein of HPV-18 or a functional variant thereof; and an E7 protein of HPV-18 or a functional variant thereof. Thereby, a junction is formed between the adjacent HPV antigens (i.e., E6 protein of HPV-16 and E7 protein of HPV-16; or E6 protein of HPV-18 and E7 protein of HPV-18) in the second fusion protein or the third fusion protein.

Due to the aforementioned arrangement of the first fusion protein, the second fusion protein and the third fusion protein, the amino acid sequence of the junction regions in the first fusion protein are different from those in the second fusion protein and the third fusion protein.

Figure 1B:
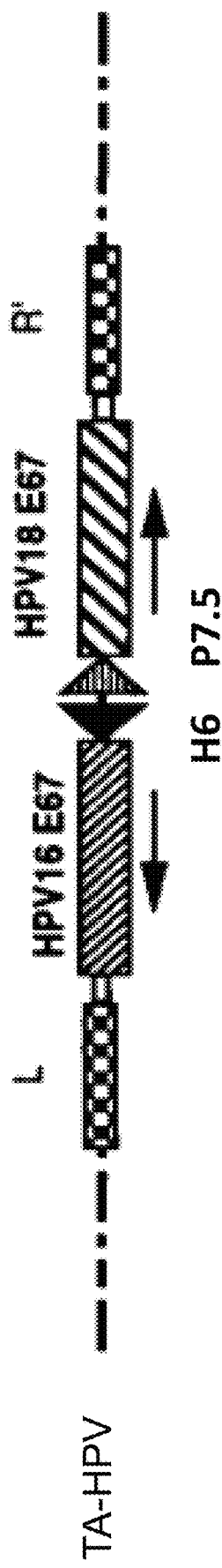
FIG. 1B is a schematic illustration showing a cassette for expression of an HPV-16 E6-E7 fusion protein and an HPV-18 E6-E7 fusion protein inserted into the genome of a vaccinia virus of the vaccine combination according to an embodiment of the present disclosure.

Examples of the first polynucleotide of the first vaccine and the second polynucleotide of the second vaccine according to the vaccine combination are illustrated in FIG. 1A and FIG. 1B, respectively.

FIG. 1A illustrates an exemplary first polynucleotide (denoted as PBI-11) that encodes the first fusion protein. The first polynucleotide includes a fusion gene encoding the first fusion protein, which in an order from N to C terminus comprises: a signal peptide (denoted as "S"), an E7 protein of HPV-16 (denoted as $E7_{(16)}$), an E7 protein of HPV-18 (denoted as $E7_{(18)}$), an E6 protein of HPV-16 (denoted as $E6_{(16)}$), an E6 protein of HPV-18 (denoted as $E6_{(18)}$), and a 70 kilodalton heat shock protein (HSP70).

The first fusion protein thereby has junction regions formed between the adjacent HPV antigens (e.g., E7 protein HPV-16 and E7 protein HPV-18, E7 protein HPV-18 and E6 protein of HPV-16, E6 protein of HPV-16 and E6 protein of HPV-18).

In some embodiments, the E7 protein of HPV-16 may comprise SEQ ID NO: 9, the E7 protein of HPV-18 may comprise SEQ ID NO: 10, the E6 protein of HPV-16 may comprise SEQ ID NO: 11, and the E6 protein of HPV-18 may comprise SEQ ID NO: 12.

In some embodiments, the E7 protein of HPV-16 may be encoded by SEQ ID NO: 13, the E7 protein of HPV-18 may be encoded by SEQ ID NO: 14, the E6 protein of HPV-16 may be encoded by SEQ ID NO: 15, and the E6 protein of HPV-18 may be encoded by SEQ ID NO: 16.

In some embodiments, pBI-11 may be used as the first vaccine of the instant vaccine combination. pBI-11, which has a nucleotide sequence as set forth in SEQ ID NO: 17, is a DNA construct including a fusion gene which includes: a subsequence encoding a signal peptide; an optimized HPV subsequence (FIG. 1A, fragments 101) encoding an E7 protein of HPV-16 as set forth in SEQ ID NO: 9, an E7 protein of HPV-18 as set forth in SEQ ID NO: 10, an E6 protein of HPV-16 as set forth in SEQ ID NO: 11, and an E6 protein of HPV-18 as set forth in SEQ ID NO: 12; and a subsequence encoding an HSP70.

In some embodiments, alternatively and/or additively, pBI-12 may be used as the first vaccine of the instant vaccine combination. pBI-12, which has a nucleotide sequence as set forth in SEQ ID NO: 18, is a DNA construct comprising a fusion gene which includes: an optimized signal sequence encoding a signal peptide; an optimized HPV subsequence encoding an E7 protein of HPV-16 as set forth in SEQ ID NO: 9, an E7 protein of HPV-18 as set forth in SEQ ID NO: 10, an E6 protein of HPV-16 as set forth in SEQ ID NO: 11, and an E6 protein of HPV-18 as set forth in SEQ ID NO: 12; and a subsequence encoding an HSP70.

In some embodiments, the first vaccine may comprise the first polynucleotide, and the first vaccine may be administered at a dose ranging from 10 micrograms per subject to 20 milligrams per subject.

FIG. 1B illustrates an exemplary second polynucleotide that encodes the second fusion protein and the third fusion protein. As shown in FIG. 1B, a cassette for expression of the second fusion protein and the third fusion protein is contained within the vaccinia virus genome (denoted as therapeutic antigen HPV (TA-HPV)). The second polynucleotide includes a first open reading frame for encoding an E6 and an E7 protein of HPV-16 (denoted as HPV16 E67 in FIG. 1B); and a second open reading frame for encoding an E6 and an E7 protein of HPV-18 (denoted as HPV18 E67 in FIG. 1B).

In some embodiments, the second polynucleotide may be contained in a recombinant virus.

In some embodiments, the recombinant virus which contains the second polynucleotide may be, but not limited to TA-HPV. The TA-HPV may be administered at a dose ranging from $1\times10^4$ pfu to $2\times10^9$ pfu. The TA-HPV may be administered preferably at a dose ranging from $2\times10^4$ pfu to $5\times10^7$ pfu.

In some embodiments, the vaccine combination of the present disclosure may be administered to a subject for treating an HPV-associated disease.

In some embodiments, the first vaccine of the vaccine combination may be administered as a priming vaccine and the second vaccine of the vaccine combination may be administered subsequently as a boosting vaccine, so as to provide a combination therapy being used in a heterologous prime-boost regimen to enhance a subject's immune responses against HPV. For example, the first vaccine may comprise the first polynucleotide and be administered at a dose ranging from 10 micrograms per subject to 20 milligrams per subject, and the second vaccine may comprise TA-HPV and be administered at a dose ranging from $1\times10^4$ pfu to $2\times10^9$ pfu.

In some embodiments, the first vaccine of the vaccine combination may be administered as a priming vaccine and be administered subsequently as a boosting vaccine, and after the administration of the first vaccine as the boosting vaccine, the second vaccine of the vaccine combination may be administered subsequently also as a boosting vaccine, so as to provide a combination therapy being used in a heterologous prime-boost regimen to enhance a subject's immune responses against HPV.

In some embodiments, the vaccine combination may further include an immune checkpoint inhibitor. The immune checkpoint inhibitor may be administered simultaneously and/or sequentially in any order with the administration of the first vaccine and/or the second vaccine. For example, the immune checkpoint inhibitor may be administered prior to and/or simultaneously with the administration of the first vaccine.

In some embodiments, the immune checkpoint inhibitor may be an immune modulator that targets PD-1, PD-L1, CTLA-4, ICOS, TIM-3, LAG-3 or TIGIT. For instance, the immune checkpoint may be an antibody targeting PD-1 (also called "anti-PD-1 antibody").

In some embodiments, the first vaccine and the second vaccine of the vaccine combination may further include an ingredient, such as an adjuvant, to create a stronger immune response in the subject receiving the vaccine.

Example 1: Design and Synthesis of the Vaccine Combination

A pBI-1 DNA construct has been described previously as pNGVL4a-SigE7(detox)HSP70 (C. Trimple et al. *Vaccine* 2003, 21:4036-4042). In one example, the pBI-11 DNA construct was derived by Gibson assembly of a synthesized DNA fragment encoding a fusion protein of a signal peptide, an E7 protein of HPV-16, an E7 protein of HPV-18, an E6 protein of HPV-16, an E6 protein of HPV-18, and a 5' portion of HSP70 (up to the Tth111I site), flanked 5' by an EcoRI and Kozak site and 3' with a Tth111I site. The synthesized DNA fragment was cloned into the pBI-1 to replace the fragment between EcoRI and Tth111I in frame with HSP70. The expressing genes for the E7 protein of HPV-16, the E7 protein of HPV-18, the E6 protein of HPV-16, and the E6 protein of HPV-18 in pBI-11 were codon-optimized and encoded by SEQ ID NO: 1-4 respectively. In another example, the pBI-12 DNA construct also included a synthesized DNA fragment encoding a fusion protein of the signal peptide, an E7 protein of HPV-16, an E7 protein of HPV-18, an E6 protein of HPV-16, an E6 protein of HPV-18, and a HSP70. The expressing genes for the signal peptide, HPV-16 E7, HPV-18 E7, HPV-16 E6, and HPV-18 E6 in pBI-12 were codon-optimized. The synthesized DNA fragment of pBI-12 was cloned into the pBI-1 to replace the fragment between EcoRI and Tth111I in frame with HSP70.

The genes in the synthesized DNA fragment of each DNA construct that have been either optimized for gene expression (FIG. 1A, fragments 101) or based on native papillomaviral sequences (FIG. 1A, fragments 103) are shown in FIG. 1A.

TA-HPV is a recombinant vaccinia viral vaccine expressing oncogenes E6 and E7 of HPV types 16 and 18. The HPV-16 and HPV-18 oncogenes E6 and E7 may be inserted in a head-to-head orientation under the control of the p7.5 and H6 promoters (denoted as P7.5 and H6, respectively, in FIG. 1B) at a neutral site in the vaccinia virus Wyeth strain genome (L. K. Borysiewicz et al., Lancet., 1996 Jun. 1; 347(9014):1523-7). For both the HPV-16 and HPV-18 genes, the E6 termination codon may be altered to create an E6/E7 fused open reading frame and defined mutation introduced to inactivate the Rb-binding site in E7.

Example 2: The Arrangement of the HPV Antigens in the Fusion Protein Encoded in the Vaccine Combination does not Include Peptides with Sequences Common to Host Proteins that can Induce Cross-Reactive Immunity Against Self-Antigens To identify vaccine epitopes that might induce cross-reactivity against self-antigens, the sequence of the first fusion protein encoded by the first vaccine to those of human proteins were compared. Considering that peptide antigens are presented as fragments of either 8-11 amino acids on MHC class I to CD8 T cells, or 12-20 amino acids on MHC class II to CD4 T cells, a search for all 8-mers generated from the HPV16/18 E6/E7 peptides plus the junctional regions in pBI-11 encoded fusion protein against human protein sequences in UniProt™, which contains the Swiss-Prot™ and TrEMBL™ databases, was carried out.

Specifically, in order to search for potential novel peptides that may be identical to endogenous peptides, all linear sequences of 5-8 amino acids in length (5-mers to 8-mers) from amino acid 24-550 of pBI-11 were generated. The linear sequences span the last 7 amino acids of the signal peptide, HPV-16 E7, HPV-18 E7, HPV-18 E6, HPV-16 E6, and the first 11 amino acids of HSP70. In total, 520 8-mers, 521 7-mers, 522 6-mers, and 523 5-mers were generated.

Furthermore, the sequences were submitted to the UniProt™ protein database (https://www.uniprot.org/) in groups of 80-100 sequences using the Peptide Search Tool provided at the website and searched for exact matches against the Swiss-Prot™ and TrEMBL™ databases filtered for human proteins. The results revealed no exact match between the pBI-11 encoded fusion protein and endogenous human peptide sequences that are at least 8 amino acids in length.

An alternative searching approach was also conducted. The Immune Epitope Database (https://www.iedb.org/) was searched by using the same region of the pBI-11 protein sequence. "Substring" for Linear Epitope to obtain any epitope sequences that are mapped to the pBI-10.1 sequence (disclosed in U.S. patent application Ser. No. 17/534,256, filed on Nov. 23, 2021) were selected. The search identified a B cell epitope derived from HPV-16 E7 in pBI-11 (see Table 1 below). This epitope is also present in pBI-1, which has been tested for its safety in human subjects. Taken together, these results indicate that the arrangement of the fusion protein encoded by the first vaccine of the instant application (e.g., pBI-11 or pBI-12) is unlikely to generate peptides that could induce cross-reactive T cell immunity against self-antigens.

TABLE 1

| Peptide epitope from pBI-11 protein identified in the Immune Epitope Database | | | |
|---|---|---|---|
| HPV Protein | Epitope | Human Protein | Uniprot ID |
| HPV16 E7 | RTLED | Glutamate decarboxylase 2 (GAD2) | A0A3B3IU09 |

In addition, pBI-11 encodes a fusion protein of the signal peptide, HPV-16 E7, HPV-18 E7, HPV-16 E6, and HPV-18 E6 ($E7_{(16)}/E7_{(18)}/E6_{(16)}/E6_{(18)}$, see FIG. 1A), arranged in an order different from that in TA-HPV (see FIG. 1B). Such arrangement can further avoid boosting immune response against junction-associated epitopes potentially contained within the fusion protein encoded by pBI-11.

As a result, the vaccine combination of the instant application reduces the risk to induce cross-reactive immune response against self-antigens and the possibility to generate immunity against junction-associated epitopes in the fusion protein comprised within or encoded by the vaccine, and thus has an improved safety.

Example 3: HPV Antigen-Specific CD8+ T Cell-Mediated Immune Responses Generated by the pBI-11 Vaccine can be Further Enhanced by Boost with TA-HPV Vaccinia Virus Vaccine In vivo T cell activation assays were performed to compare immune response in mice vaccinated with either pBI-11 alone, or pBI-11 in combination with TA-HPV.

Figure 2A:
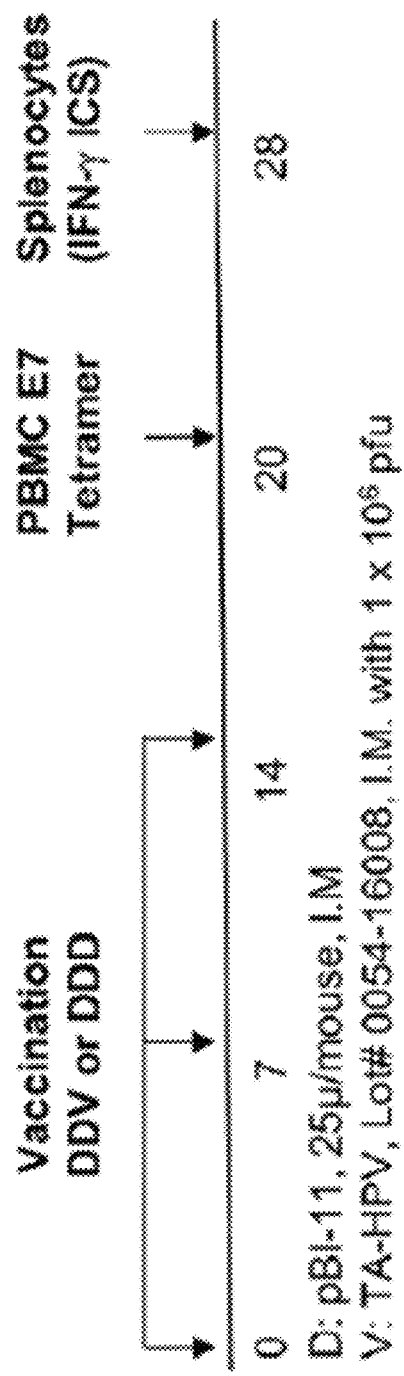
FIG. 2A is a schematic illustration of the experimental design for characterizing HPV antigen-specific $CD8^+$ T cell-mediated immune responses in mice vaccinated with the vaccine combination of the present disclosure in a prime and boost strategy (DDV regimen) or a DNA vaccine alone in a prime and boost strategy (DDD regimen), in accordance with an embodiment of the present disclosure.

FIG. 2A is a schematic illustration of the experiment design. 6- to 8-week-old female C57BL/6 mice purchased from Taconic Biosciences (Germantown, NY) were vaccinated pBI-11 (25 mg/50 ml/mouse) through intramuscular (I.M.) injection. The mice were divided into a control group (naive group), a DDD group and a DDV group. Each mouse in each group was boosted with the same regimen 7 days later. One week after the second vaccination, the DDD group of the mice (denoted as DDD in FIG. 2A) was vaccinated with pBI-11 (25 mg/50 ml/mouse) through I.M. injection. The DDV group of mice (denoted as DDV in FIG. 2A) was vaccinated with TA-HPV ($1 \times 10^6$ pfu/50 ml/mouse) through I.M. injection. Six days after the last vaccination, peripheral blood was collected from the vaccinated or naive mice for HPV-16 E7 tetramer staining. Fourteen days after the last vaccination, splenocytes were prepared from the vaccinated mice and stimulated with either HPV-16 E6 (aa 50 to 57), HPV-16 E7 (aa 49 to 57), or HPV-18 E6 (aa 67 to 75) peptide in the presence of GolgiPlug™ (BD Biosciences, San Diego, CA). It is known that the presentation of epitope HPV-16 E6 (aa 50 to 57) is suppressed by the immunodominant epitope of HPV-16 E7 (aa 49 to 57). Intracellular IFN-γ cytokine staining assay was performed to detect antigen-specific CD8+ T cells. The cells were acquired with a FACSCalibur™ flow cytometer, and data were analyzed with Cell-Quest Pro software (BD Biosciences, Mountain View, CA).

Figure 2C:
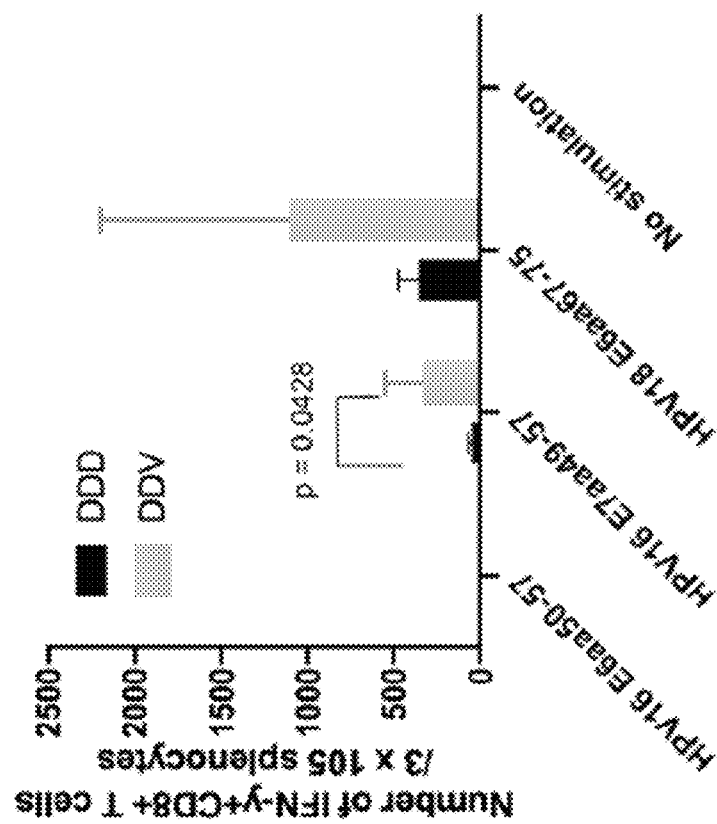
FIG. 2C is a bar chart of the number of HPV-16 E7-specific IFN-$\gamma^+$ $CD8^+$ T cells/$3\times10^5$ splenocytes from mice vaccinated with the vaccine combination of the present disclosure (DDV regimen) or the DNA vaccine alone (DDD regimen) after stimulation with either HPV-16 E6 (aa 50-57), peptide HPV-16 E7 (aa 49-57) peptide or HPV-18 E6 (aa 67-75) peptide, in accordance with an embodiment of the present disclosure.
Figure 2B:
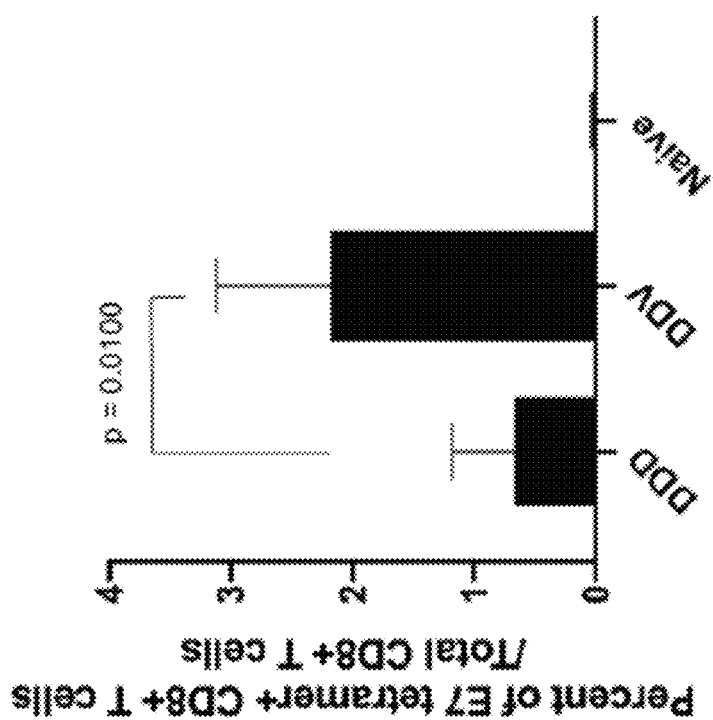
FIG. 2B is a bar chart showing the percentage of HPV-16 E7-specific $CD8^+$ T cells/total $CD8^+$ cells in peripheral blood mononuclear cells (PBMCs) collected from naïve mice or mice treated with the vaccine combination of the present disclosure (DDV regimen) or the DNA vaccine alone (DDD regimen) using HPV-16 E7 (aa 49-57) peptide-loaded tetramer staining, using a two-tailed Student's t-test, in accordance with an embodiment of the present disclosure.

As shown in FIG. 2B, mice vaccinated with the DDV regimen had significantly higher percentages of E7-specific CD8$^+$ T cells than mice vaccinated with pBI-11 alone (DDD) or naïve mice.

Furthermore, FIG. 2C shows that mice in a prime-vaccinia boost (DDV) had significantly higher numbers of HPV-16 E7-specific T cells (P=0.0428) and higher HPV-18 E6-specific T cells (P=0.2116) than those that only received pBI-11. In fact, HPV16 E7-specific CD8$^+$ T cell-mediated immune responses in mice vaccinated with TA-HPV alone was previously characterized (*Virology* 2018 December; 525:205-215). It is found that mice vaccinated with TA-HPV alone did not generate appreciable HPV16 E7-specific CD8$^+$ T cell-mediated immune responses (*Virology* 2018 December; 525:205-215). However, our result indicates that TA-HPV booster vaccination is capable of simultaneously enhancing HPV-16 and HPV-18 antigen-specific CD8$^+$ T cell immune responses generated after priming with pBI-11 DNA vaccine.

Based on the above results, the heterologous prime-boost vaccination using the first vaccine (e.g., pBI-11) in combination with the second vaccine (e.g., TA-HPV) according to the vaccine combination of the present disclosure induces an elevated HPV antigen-specific CD8$^+$ T cell-mediated immune responses compared to administration with the first vaccine (e.g., pBI-11) alone.

Example 4: The Vaccine Combination of the Present Disclosure can be Combined with Anti-PD-1 Immune Checkpoint Blockade to Improve Therapeutic Antitumor Response The ability of the vaccine combination of the present disclosure in combination with an anti-PD-1 immune checkpoint inhibitor to generate therapeutic antitumor effects against HPV-associated diseases were examined in the HPV-16 E6/E7$^+$ TC-1 tumor model.

Figure 3B:
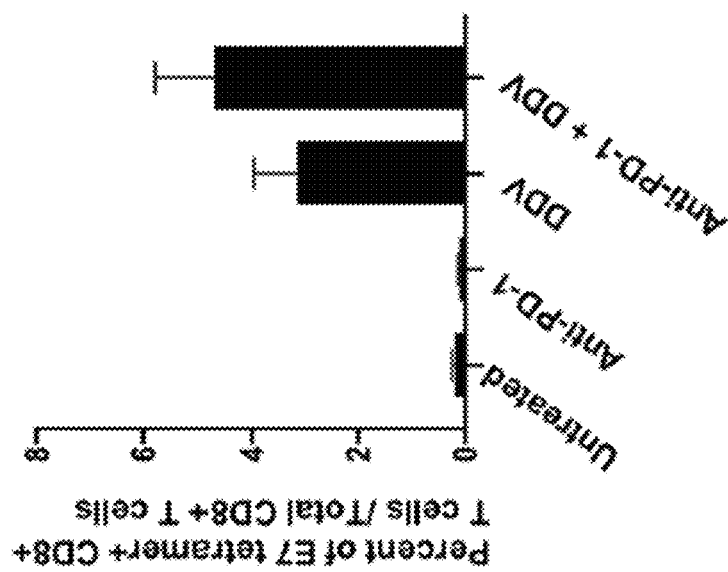
FIG. 3B is a bar chart showing the percentage of HPV-16 E7-specific $CD8^+$ T cells/total CD $8^+$ T cells in peripheral blood mononuclear cells (PBMCs) prepared from untreated mice, mice treated with anti-PD-1 antibody alone, mice treated with the vaccine combination of the present disclosure (DDV), or mice treated with the vaccine combination of the present disclosure in combination with anti-PD-1 antibody (Anti-PD-1+DDV), using HPV-16 E7 (aa 49-57) peptide-loaded tetramer staining, using a two-tailed Student's t-test, in accordance with an embodiment of the present disclosure.
Figure 3A:
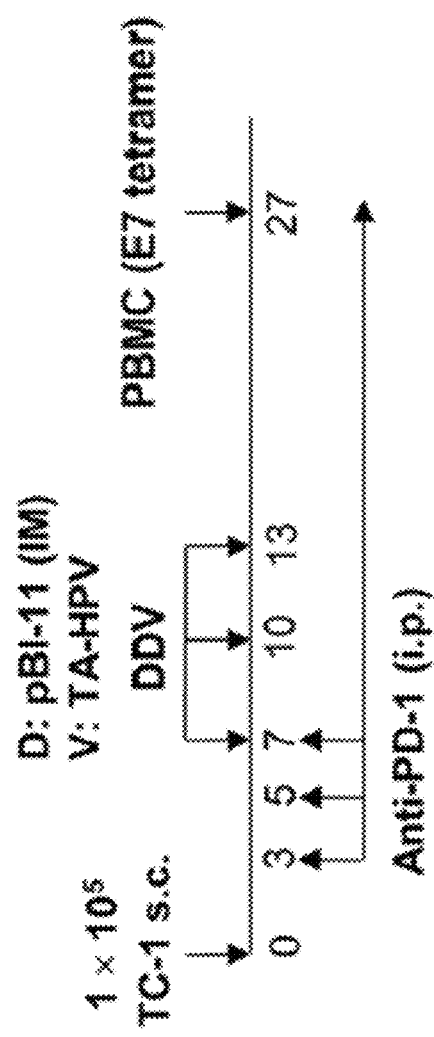
FIG. 3A is a schematic illustration of the experimental design for characterizing the HPV antigen-specific immune response and antitumor effects in TC-1 tumor-bearing mice treated with the vaccine combination of the present disclosure in a prime and boost strategy with or without anti-PD-1 antibody, in accordance with an embodiment of the present disclosure.

FIG. 3A is a schematic illustration of the experiment design. 6- to 8-week-old female C57BL/6 mice were injected with 2×10$^5$ of TC-1 tumor cells subcutaneously on day 0. On day 3, the mice were divided into 4 groups (untreated group, anti-PD-1 group, DDV group and anti-PD-1+DDV group). The mice in the anti-PD-1 group were injected with purified anti-mouse PD-1 monoclonal antibody (MAb; clone 29F.1A12, 200 mg/mouse) via intraperitoneal injection. The treatment was repeated every other day. The mice in the DDV group were vaccinated with pBI-11 (25 mg/50 ml/mouse) through I.M. injection and boosted once 3 days later, and were further boosted with TA-HPV vaccinia virus 3 days later through skin scarification. The mice in the anti-PD-1+DDV group were treated with both anti-mouse PD-1 MAb and pBI-11 DNA vaccine prime followed by TA-HPV vaccinia virus boost. On day 27, PBMCs were collected for the characterization of HPV-16 E7-specific CD8$^+$ T cell-mediated immune responses using HPV-16 E7 peptide (aa 49 to 57)-loaded tetramer staining.

In one example, schematic illustration of the experiment in FIG. 3A shows that the immune checkpoint inhibitor (e.g., anti-PD-1 antibody) was administered prior to heterologous prime-boost vaccination (e.g., DDV). However, in other examples, additively and/or alternatively, the immune checkpoint inhibitor may be administered during the course of heterologous prime-boost vaccination.

For tetramer staining, mouse PBMCs were stained with purified anti-mouse CD16/32 first and then stained with FITC-conjugated anti-mouse CD8a and PE-conjugated HPV-16 E7 (aa 49-57) peptide-loaded H-2D$^b$ tetramer at 4° C. for 1 hour. After washing, the cells were stained with 7-AAD. The cells were acquired with the FACSCalibur™ flow cytometer and analyzed with CellQuest Pro software (BD Biosciences, Mountain View, CA). The results of tetramer staining are shown in FIG. 3B.

Figure 3C:
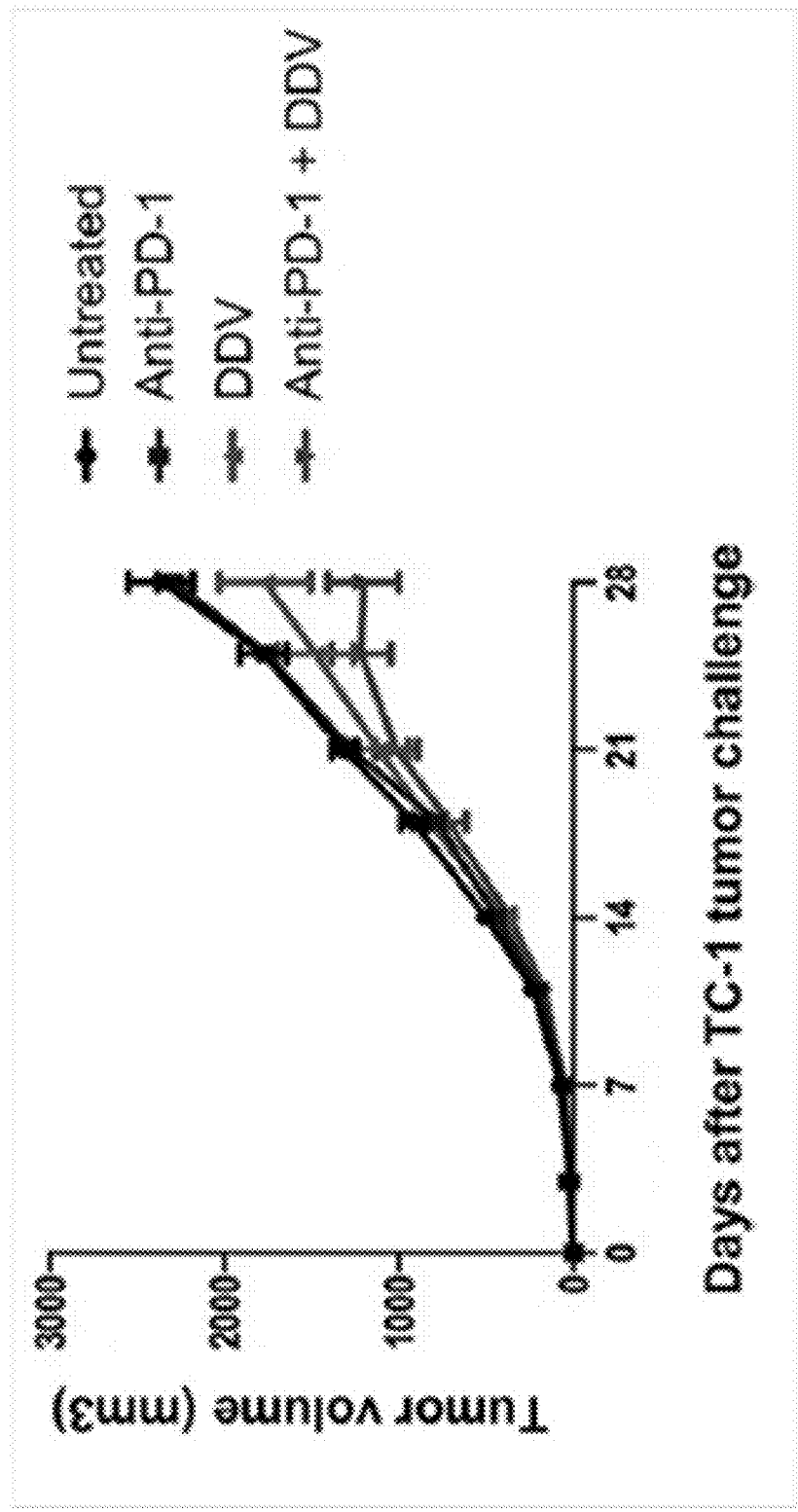
FIG. 3C is a curve chart showing TC-1 tumor volumes in the untreated mice, the mice treated with anti-PD-1 antibody alone, the mice treated with the vaccine combination of the present disclosure (DDV), or the mice treated with the vaccine combination of the present disclosure in combination with anti-PD-1 antibody (Anti-PD-1+DDV), in accordance with an embodiment of the present disclosure.
Figure 3D:
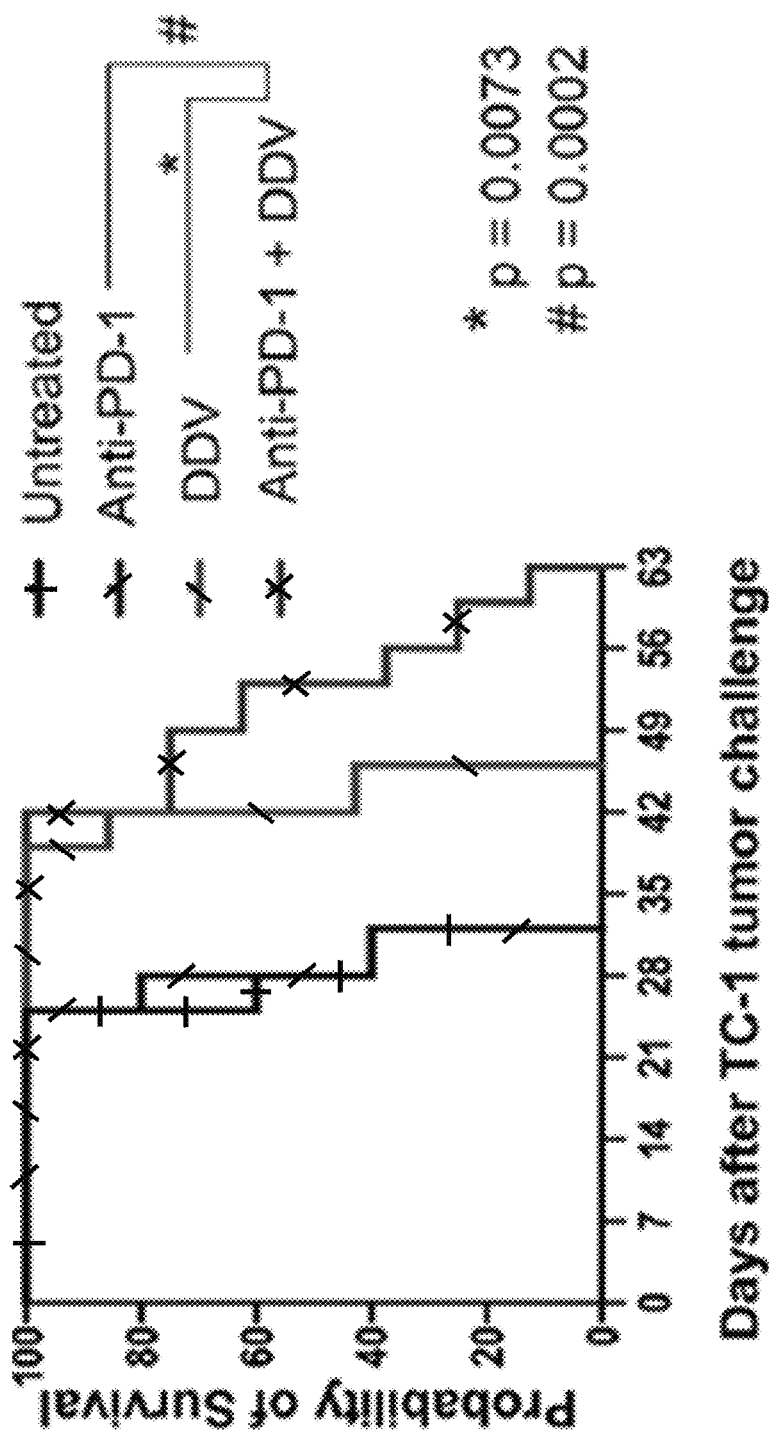
FIG. 3D is a Kaplan-Meier survival curve showing the probability of survival in the untreated mice, the mice treated with anti-PD-1 antibody alone, the mice treated with the vaccine combination of the present disclosure (DDV), or the mice treated with the vaccine combination of the present disclosure in combination with anti-PD-1 antibody (Anti-PD-1+DDV), in accordance with an embodiment of the present disclosure.

The growth of the tumor was monitored twice a week by palpation and digital caliper measurement. Tumor volume was calculated using the formula [largest diameter×(perpendicular diameter)$^2$]×3.14/6 and is shown in FIG. 3C. The survival rate of the tumor-bearing mice was recorded, as illustrated in FIG. 3D, where both natural death and a tumor diameter greater than 2 cm leading to death were counted as death.

As shown in FIG. 3B, mice receiving DDV regimen, either alone or with anti-PD-1 antibody, displayed HPV-16 E7-specific CD8$^+$ T cell-mediated immune responses, whereas in the absence of vaccination with anti-PD-1 antibody, treatment of anti-PD-1 antibody did not elicit a detectable HPV-16 E7-specific CD8$^+$ T cell response.

Furthermore, FIG. 3C demonstrated that addition of anti-PD-1 antibody treatment to the DDV regimen significantly enhanced the therapeutic antitumor effects. This suggests synergy of vaccination and anti-PD-1 antibody treatment and that the latter is not effective without a prior immune response. Additionally, FIG. 3D shows that the combinational treatment (anti-PD-1+DDV) translated into significantly (P=0.0073 when compared to DDV, and P=0.0002 when compared to anti-PD-1) better survival of the tumor-bearing mice.

In conclusion, the vaccine combination of the present disclosure including a first vaccine which comprises a first fusion protein with an indicated arrangement of HPV antigens, or a first polynucleotide encoding the same; and a second vaccine which comprises a second fusion protein and a third fusion protein both with an arrangement of HPV antigens different from that in the first fusion protein, or a second polynucleotide encoding the second fusion protein and the third fusion protein, not only reduces the risk to induce cross-reactive immunity against self-antigens and to boost an immune response against junction-associated epitopes in the fusion protein contained in or encoded by the vaccine, but also exhibits a significant HPV antigen-specific immune response. Moreover, the vaccine combination of the present disclosure in combination with an immune checkpoint inhibitor (e.g., anti-PD-1 antibody) elicits a stronger HPV antigen-specific antitumor response in vivo and further translates into more potent antitumor efficacy.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A vaccine combination comprising:
   a first vaccine comprising: a first fusion protein or a first polynucleotide encoding the first fusion protein, wherein the first fusion protein, in an order from N to C terminus, comprises:
   (i) an E7 protein of human papillomavirus type 16 (HPV-16) or a functional variant thereof, the E7 protein of HPV-16 or the functional variant thereof comprising SEQ ID NO: 1 at a beginning of the E7 protein of HPV-16 and SEQ ID NO: 2 at an end of the E7 protein of HPV-16;
   (ii) an E7 protein of human papillomavirus type 18 (HPV-18) or a functional variant thereof, the E7 protein of HPV-18 or the functional variant thereof comprising SEQ ID NO: 3 at a beginning of the E7 protein of HPV-18 and SEQ ID NO: 4 at an end of the E7 protein of HPV-18;
   (iii) an E6 protein of HPV-16 or a functional variant thereof, the E6 protein of HPV-16 or the functional variant thereof comprising SEQ ID NO: 5 at a beginning of the E6 protein of HPV-16 and SEQ ID NO: 6 at an end of the E6 protein of HPV-16;
   (iv) an E6 protein of HPV-18 or a functional variant thereof, the E6 protein of HPV-18 or the functional variant thereof comprising SEQ ID NO: 7 at a beginning of the E6 protein of HPV-18 and SEQ ID NO: 8 at an end of the E6 protein of HPV-18; and
   (v) a heat shock protein or a functional variant thereof; and
   a second vaccine comprising: a second fusion protein and a third fusion protein, or a second polynucleotide encoding the second fusion protein and the third fusion protein, wherein the second fusion protein comprises:
   another E6 protein of HPV-16 or a functional variant thereof; and
   another E7 protein of HPV-16 or a functional variant thereof, and the third fusion protein comprises:
   another E6 protein of HPV-18 or a functional variant thereof; and
   another E7 protein of HPV-18 or a functional variant thereof, and
   wherein amino acid sequences of junction regions in the first fusion protein are different from amino acid sequences of junction regions in the second fusion protein and the third fusion protein.

2. The vaccine combination according to claim 1, wherein the E7 protein of HPV-16 of the first fusion protein comprises SEQ ID NO: 9.
   the E7 protein of HPV-18 of the first fusion protein comprises SEQ ID NO: 10,
   the E6 protein of HPV-16 of the first fusion protein comprises SEQ ID NO: 11, and
   the E6 protein of HPV-18 of the first fusion protein comprises SEQ ID NO: 12.

3. The vaccine combination according to claim 1, wherein the E7 protein of HPV-16 of the first fusion protein is encoded by SEQ ID NO: 13,
   the E7 protein of HPV-18 of the first fusion protein is encoded by SEQ ID NO: 14,
   the E6 protein of HPV-16 of the first fusion protein is encoded by SEQ ID NO: 15, and
   the E6 protein of HPV-18 of the first fusion protein is encoded by SEQ ID NO: 16.

4. The vaccine combination according to claim 1, wherein the first polynucleotide comprises SEQ ID NO: 17.

5. The vaccine combination according to claim 1, wherein the first polynucleotide comprises SEQ ID NO: 18.

6. The vaccine combination according to claim 1, wherein the second polynucleotide is contained within a recombinant virus.

7. The vaccine combination according to claim 6, wherein the recombinant virus is a therapeutic antigen human papillomavirus (TA-HPV).

8. A method for treating an HPV-associated disease in a subject thereof, comprising:
   administering the vaccine combination according to claim 1 to the subject,
   wherein the first vaccine is administered as a priming vaccine, and the second vaccine is administered as a boosting vaccine.

9. The method according to claim 8, further comprising:
   administering another first vaccine to the subject as a boosting vaccine after the administration of the first vaccine as the priming vaccine and prior to the administration of the second vaccine as another boosting vaccine.

10. The method according to claim 8, wherein the first vaccine comprises the first polynucleotide, and wherein the first vaccine is administered at a dose ranging from 10 micrograms per subject to 20 milligrams per subject.

11. The method according to claim 8, wherein the second vaccine comprises a therapeutic antigen human papillomavirus (TA-HPV), and wherein the second vaccine is administered at a dose ranging from $1\times10^4$ plaque-forming units (pfu) to $2\times10^9$ pfu.

12. The method according to claim 8, further comprising:
    administering a chemotherapy, a radiotherapy, a chemo-radiotherapy, a cryotherapy, a thermotherapy, a targeted therapy, a cellular therapy, a gene therapy, or an immunotherapy in combination with the administration of the vaccine combination.

13. The method according to claim 12, wherein the chemotherapy, the radiotherapy, the chemo-radiotherapy, the cryotherapy, the thermotherapy, the targeted therapy, the cellular therapy, the gene therapy, or the immunotherapy is administered at least one of prior to or simultaneously with the administration of the first vaccine.

14. The method according to claim 12, wherein the immunotherapy comprises administering an immune checkpoint inhibitor to the subject.

15. The method according to claim 14, wherein the immune checkpoint inhibitor is an immune modulator targeting programmed cell death protein 1 (PD-1), a programmed death-ligand 1 (PD-L1), a cytotoxic T-lymphocyte-associated antigen 4 (CTLA-4), an inducible costimulator (ICOS), a T-cell immunoglobulin and mucin domain 3 (TIM-3), a lymphocyte activation gene 3 (LAG-3) or a T cell immunoglobulin and immunoreceptor tyrosine-based inhibitory motif (ITIM) domain (TIGIT).

16. The method according to claim 14, wherein the immune checkpoint inhibitor is an anti-PD-1 antibody.

* * * * *